US006314084B1

(12) United States Patent
Kahale et al.

(10) Patent No.: US 6,314,084 B1
(45) Date of Patent: Nov. 6, 2001

(54) TRANSMISSION SYSTEM, METHOD AND APPARATUS FOR SCHEDULING TRANSMISSION LINKS AND DETERMINING SYSTEM STABILITY BASED ON DYNAMIC CHARACTERISTICS OF A TRANSMISSION MEDIUM

(75) Inventors: Nabil E. Kahale, Paris County (FR); Paul Emerson Wright, Basking Ridge, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 08/986,028

(22) Filed: Dec. 5, 1997

(51) Int. Cl.[7] .............................. H04J 3/24; H04H 1/00; H04B 7/212; H04L 12/28
(52) U.S. Cl. ..................... 370/230; 370/312; 370/337; 370/348; 370/431; 455/62; 455/63; 455/452
(58) Field of Search ..................... 370/348, 436, 370/443, 461, 336, 412, 444, 395, 431, 335, 233, 234; 455/33.1, 34.1, 56.1

(56) References Cited

U.S. PATENT DOCUMENTS

| 5,165,021 | * | 11/1992 | Wu et al. ........................ 395/250 |
| 5,598,417 | * | 1/1997 | Crisler et al. ................... 370/348 |
| 5,613,198 | * | 3/1997 | Ahmadi et al. .................. 455/33.1 |
| 5,719,868 | * | 2/1998 | Young ............................. 370/436 |
| 5,729,540 | * | 3/1998 | Wegrzyn ......................... 370/336 |
| 5,917,822 | * | 6/1999 | Lyles et al. ..................... 370/395 |
| 5,966,375 | * | 10/1999 | Kagaya ........................... 370/338 |
| 6,064,651 | * | 5/2000 | Rogers et al. ................... 370/233 |
| 6,078,568 | * | 6/2000 | Wright et al. ................... 370/312 |

OTHER PUBLICATIONS

S. Ramanathan, A Unified Framework and Algorithm for (T/F/C) DMA Channel Assignment in Wireless Networks.
Whitehead, "Global Packet Dynamic Resources Allocation for Wireless Networks" (Patent application serial number and filing date unknown).

* cited by examiner

Primary Examiner—Wellington Chin
Assistant Examiner—M. Phan
(74) Attorney, Agent, or Firm—Kenyon & Kenyon

(57) ABSTRACT

A transmission system models changing characteristics of a transmission medium in which it operates and schedules transmission accordingly. For any two transmissions that are desired to be made on the same resource, the system determines whether the transmissions may be made simultaneously without causing interference given a current state of the transmission medium. If the transmissions may be made without causing interference, they are. If not, one transmission is sent in favor over another as determined by a predetermined scheduling criterion. The system modulates a rate at which new data is admitted to the system. The system calculates an arrival rate that is likely to be (but is not necessarily) stable and modulates the actual arrival rate accordingly.

8 Claims, 3 Drawing Sheets

TRANSMISSION SYSTEM, METHOD AND APPARATUS FOR SCHEDULING TRANSMISSION LINKS AND DETERMINING SYSTEM STABILITY BASED ON DYNAMIC CHARACTERISTICS OF A TRANSMISSION MEDIUM

BACKGROUND OF THE INVENTION

The present invention relates to transmission systems and, more particularly, to a method of scheduling links for simultaneous transmission over a single resource based upon dynamic characteristics of the transmission medium.

In wireless communications systems, several techniques are known to isolate links from one another. The conventional advanced mobile phone system (AMPS) uses frequency division multiple access (FDMA) techniques to isolate calls. FDMA isolates calls by assigning each call within a cell to a unique pair of RF channels. No two calls within a cell are permitted to share the same channel assignment. Consequently, the calls do not interfere. A second technique, time division multiple access (TDMA), builds upon the advantages of FDMA by dividing an RF channel into repeating frames, each frame containing a predetermined number of time slots. Individual calls on the same RF channel are assigned to different time slots, thereby ensuring that the calls do not mutually interfere. A third technique, code division multiple access (CDMA), modulates each call with a code that uniquely identifies the call from others that may be transmitted on the same frequency. CDMA receivers decode only the call that is modulated with the code that uniquely identifies the proper call. CDMA may or may not be used with FDMA and TDMA techniques.

A fourth technique, frequency-hopped spread spectrum (FHSS), assigns to each call a periodic sequence of frequencies for use in transmission alternately in succession. Such a sequence of frequencies is called a "hop-sequence." This system is based on the principle that if each user uses a different (preferably random) hop-sequence, dominant interferers are removed and the average interference seen by a call over a hop period is reduced. Call transmissions are demodulated by knowing the hop-sequence assigned to that call.

In these known cellular systems, the resources that isolate individual calls (channels in FDMA, time slots in TDMA, codes in CDMA, hopping sequences in FHSS) may be reused in other cells. Reuse permits two transmitters that will not interfere due to signal attenuation and multi-path interference, to use the same resource. Generally, adjacent cells are not permitted to use the same resource because their proximity encourages interference. Reuse techniques are not unique to cellular applications; for example, public broadcast FM radio reuses channel assignments in various geographically spaced cities throughout the United States. In operating systems, the rate of reuse is a static parameter that is established upon system installation.

However, dynamic reuse techniques currently are subject to investigation in research. Such techniques typically involve a modeling of the transmission medium into a path gain matrix. The matrix may be simplified into a matrix of pairwise interference relationships under an assumption that interference received over a given link is dominated by a single interference source. The resultant binary combinatorial matrix simplifies calculation and scheduling of links for transmission. However, because such an assumption is not necessarily correct, it may lead to less than optimal throughput.

Accordingly, there is a need in the art for a scheduling scheme in a transmission system having dynamic reuse that achieves higher throughput than known schemes. Further, there is a need in the art for a transmission scheduling hierarchy that determines whether a scheduling scheme provides system stability.

SUMMARY OF THE INVENTION

The present invention alleviates the disadvantages of the prior art to a great degree by providing a transmission system that examines the changing characteristics of the transmission medium in which it operates and schedules transmissions accordingly. The system identifies a set of links to be scheduled and models the transmission medium to determine the interference that each link causes to each other link. The system assigns weights to each link based upon predetermined criteria. In a first embodiment, the system then schedules the links as prioritized by the weights, skipping links that are disqualified based upon other previously scheduled links. In a second embodiment, the system iteratively computes a cost of scheduling each link, schedules the link with the lowest cost, then repeats the computation and scheduling steps until all links are exhausted.

By scheduling transmissions in response to the changing characteristics of the transmission medium, the system modulates a rate at which new data is admitted to the system. If the system admits new data at a higher rate than it transmits data, the system would not be stable. The system calculates an arrival rate that is likely to be stable and modulates the actual arrival rate accordingly.

DETAILED DESCRIPTION

Figure 1:
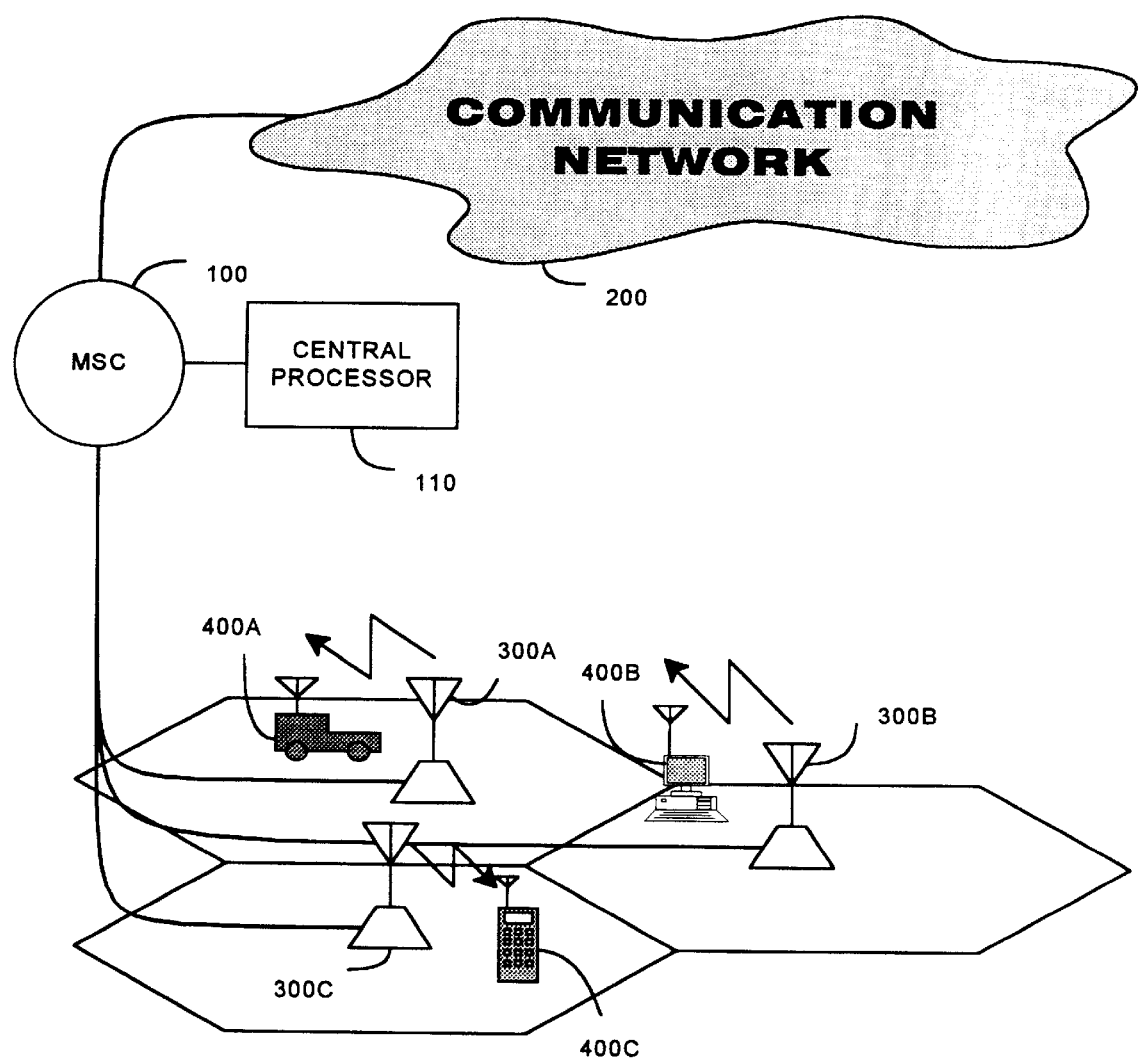
FIG. 1 is an illustration of a transmission system appropriate for use with the present invention.

The present invention is directed to the treatment of two issues in the administration and reuse of transmission resources: 1) How many customers may the system admit for service and maintain stability, and 2) once a customer is admitted for service, how should the customer be scheduled for service? The following discussion explains the operating principles of the present invention in the context of a simplified wireless time division multiplex (TDM) system transmitting packets of data, shown in FIG. 1. In that system, a plurality of transmitters transmit packet data to receivers in time slots. However, the principles of the present invention are equally applicable to other transmission schemes, such as FDMA and CDMA regardless of whether the transmissions are wired or wireless.

Packets are scheduled for transmission by a mobile switching center ("MSC") of FIG. 1. The MSC is a component of conventional wireless transmission systems that includes a central processor 110. The MSC is provided in communication with a first telecommunication network 200, such as the public switched telephone network ("PSTN"), for receiving data to be transmitted to receivers 400A–C in the wireless system. The MSC 100 also communicates with a plurality of transmitters 300A–C that transmit to the receivers 400A–C. The MSC 100 may communicate to both the PSTN and its transmitters 300A–C over trunk lines.

Each transmitter transmits to one or more receivers, which may be fixed or mobile. The receivers 400A–C may constitute any of a host of wireless communications equipment, for example, cell phones, car phones, one and two-way pagers and wireless modems for computers. At any given instant of time, or "time-step," each receiver 400A–C is programmed to receive transmissions from the transmitters 300A–C over one of a plurality of "resources." In the TDM example, the resource is a channel and time slot assignment. The receivers 400A–C are assigned to predetermined channels and time slots for receiving data.

Under a dynamic reuse scheme, it is desired that more than one transmitter transmit its data to its associated receiver over a single resource. Each transmitter receiver pair using the same resource is called a "link." The dynamic reuse scheme attempts to identify a set of links that may be transmitted simultaneously over a single resource without destructive interference. The links may be scheduled if the transmission medium attenuates each link before it interferes with another.

To estimate whether two or more links may share a resource, the MSC 100 develops a model of the transmission medium. The model estimates a transmission gain $G_{ij}$ for each link, representing the attenuation and multi-path effects suffered by a transmission from a transmitter i to a receiver j. The estimate may be obtained from bit error measurements gathered from earlier transmission made by the system. Bit error measurements are conventional techniques known to those of skill in the art. The transmission gain estimates of all links may be organized into a path gain matrix G ($G=[G_{ij}]$).

For each link i, the system also estimates a power level $p_i$, representing a power level to be used for transmission over link i. For transmission, the power level of transmission ideally is high enough to guarantee a clear transmission over link i but also is low enough to prevent undue interference with the other links using the same resource. Power of the other links contributes to an interference signal received by the receiver of link i and may be calculated as $\Sigma_{j \neq i} G_{ji} p_j$.

Every link i accommodates a certain amount of interference before the interference affects the quality of the received transmission. To represent this phenomenon, the system defines a set of signal to interference ratio ("SIR") thresholds for each link i, labeled "$\gamma_i$." Each threshold associates a maximum interference signal that can be received over link i without affecting reception quality of the intended transmission signal from the transmitter of link i. If the system determines through modeling that other links will cause interference at link i such that the actual SIR is less than the minimum necessary SIR, $\gamma_i$, the transmission of link i will not be scheduled for transmission with the other links. The SIR thresholds may be organized into a matrix $\Gamma$ ($\Gamma = \text{diag}(\gamma_1, \gamma_2, \ldots, \gamma_m)$).

In addition to meeting the required SIR threshold, the system must transmit data over the links at a rate that maintains system stability. To be stable, the system transmits data packets at a rate that meets the arrival rate of new packets to the system. Because transmission capacity will change over time due to changing characteristics of the transmission medium, the system must determine whether the system capacity will keep up with the demand for capacity.

Each link i has a queue associated with it. It is assumed for purposes of mathematical analysis that new packets will arrive at link i at a rate $r_i$ according to a Poison distribution. When a packet arrives at link i, it is appended to the queue at the link. When a set of links S is scheduled at a time-step, the scheduled packets of each link in S are removed from the queue.

TAILORING ARRIVAL RATE TO MATCH ENVIRONMENTAL CONDITIONS

The present invention exploits a mathematical characteristic of real matrices. In any real matrix N having non-negative off-diagonal entries, the one eigenvalue of N having the largest real part is real. This follows from the theory of non-negative matrices. In our discussion, this real eigenvalue is designated "$\lambda_0(N)$." Both matrices G and $\Gamma$ are real matrices having non-negative off-diagonal entries.

To determine whether a given set of transmissions may be made simultaneously over the same resource, matrix G may be expressed as matrix G' ($G'=[G'_{ij}]$, where $G'_{ij}=G_{ij}/G_{ii}$). A set S of links can be transmitted (i.e. is "feasible") at a given time-step if and only if there exists a power vector whose support is S such that:

$$\Gamma G' p + v \leq p, \quad (1)$$

where v is a noise vector determined through measurement of the transmission medium. If the condition is met, then the actual SIR received at link i will exceed the minimum SIR threshold $\gamma_i$. This condition is equivalent to determining whether the following condition is met:

$$\lambda_0(G'_s - \Gamma_s^{-1}) < 0, \quad (2)$$

where $G'_s$ is a sub-matrix induced by the elements of S. Mathematically, calculation of an optimal set of links S that will satisfy the conditions shown in Eqs. (1) or (2) is "NP-hard" for different optimality criteria (e.g. a maximum number of links transmitted over the resource). Realistically, NP-hard expressions may not be calculated by a computer because the number of calculations required to solve the expression increases exponentially with the number of variables to be solved. Note that the matrix G has not been reduced based upon an assumption that the path gain matrix is dominated by any single interference source.

Based upon Eqs. (1) and (2), a scheduling algorithm exists that maintains long term stability so long as the following relationship holds:

$$\lambda_0 \left( R - \frac{1}{\lambda_{n-1}(R^{-1}B)} B \right) \leq 1, \quad (3)$$

where R is a diagonal matrix representing the input rates of each link $r_i$, $B = (\min(G'_{ij}, G'_{ji})) - \Gamma^{-1}$ and $\lambda_{n-1}$ is the smallest eigenvalue of $(R^{-1}B)$. If there is a scheduling algorithm, it must satisfy Eq. (3); however, not all circumstances that satisfy Eq. (3) will guarantee that a scheduling algorithm exists.

The present invention exploits a simplification of Eq. (3). Arrival rates to the queues of each link i are confined to a single value ($r_i = r$ for all i). With this simplification, Eq. (3) is expressed as:

$$r \leq \frac{\lambda_{n-1}(B)}{\lambda_{n-1}(B) - \lambda_0(B)}, \quad (4)$$

where B is any non-null symmetric matrix such that:

$$0 \leq (B + \Gamma^{-1})_{ij} \leq \min(G_{ij}, G_{ji}) \text{ for all } i, j.$$

In practice, the inventors have chosen $B_{ij}=(\min(G'_{ij}, G'_{ji}, (\gamma_i\gamma_j)_{-\frac{1}{2}}))-\Gamma_{ij}^{-1}$. Eq. (4) is not NP-hard and may be calculated by the processor 110 of a conventional MSC 100.

Using the above relation, the system monitors environmental conditions and estimates its service capacity therefrom. As these environmental conditions change, system capacity changes accordingly. The system relates the changes in transmission characteristics according to the above model and, when the actual arrival rate exceeds the value of r achieved in Eq. (4), the system denies any new arrival requests over the rate determined in Eq. (4). The system continues to monitor the characteristics of the transmission medium and, when capacity increases cause increases in the value of r calculated in Eq. (4), the system permits the actual arrival rate to rise accordingly.

SCHEDULING PACKET TRANSMISSIONS

Once new packets have been admitted to the system and are queued for transmission, the system must calculate a set of links S that may be transmitted simultaneously over a resource. As noted, the computation of an optimal set of links is NP-hard. The system of the present invention uses one of two scheduling algorithms to achieve good ergodic throughput.

Figure 2:
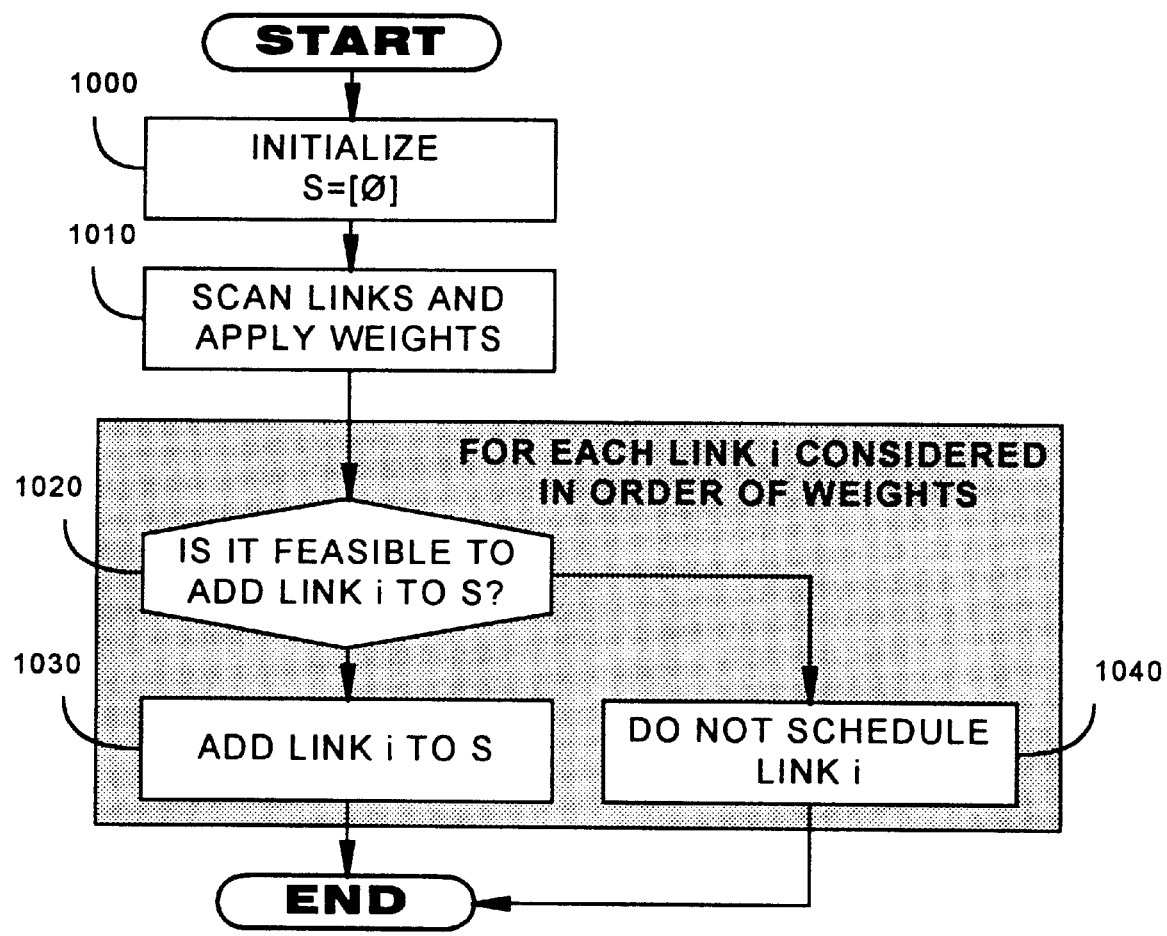
FIG. 2 is a flow chart describing the operation of a processor operating in accordance with a first embodiment of the present invention.

The first scheduling algorithm is shown in FIG. 2. The system initializes a set of scheduled links S to be the empty set (S=[Ø]) (Step 1000). The system also surveys each link and weights the links according to a predetermined attribute (Step 1010). The attribute may be the size of the queue at each link or the age of the oldest packet in queue at the link.

The system scans the links in order of the weights and, for each link, determines whether it would be feasible to add the link to S (Step 1020). If so, the link is added to S (Step 1030). If not, the link is not scheduled (Step 1040). Steps 1020–1040 are repeated until every link has been considered.

Figure 3:
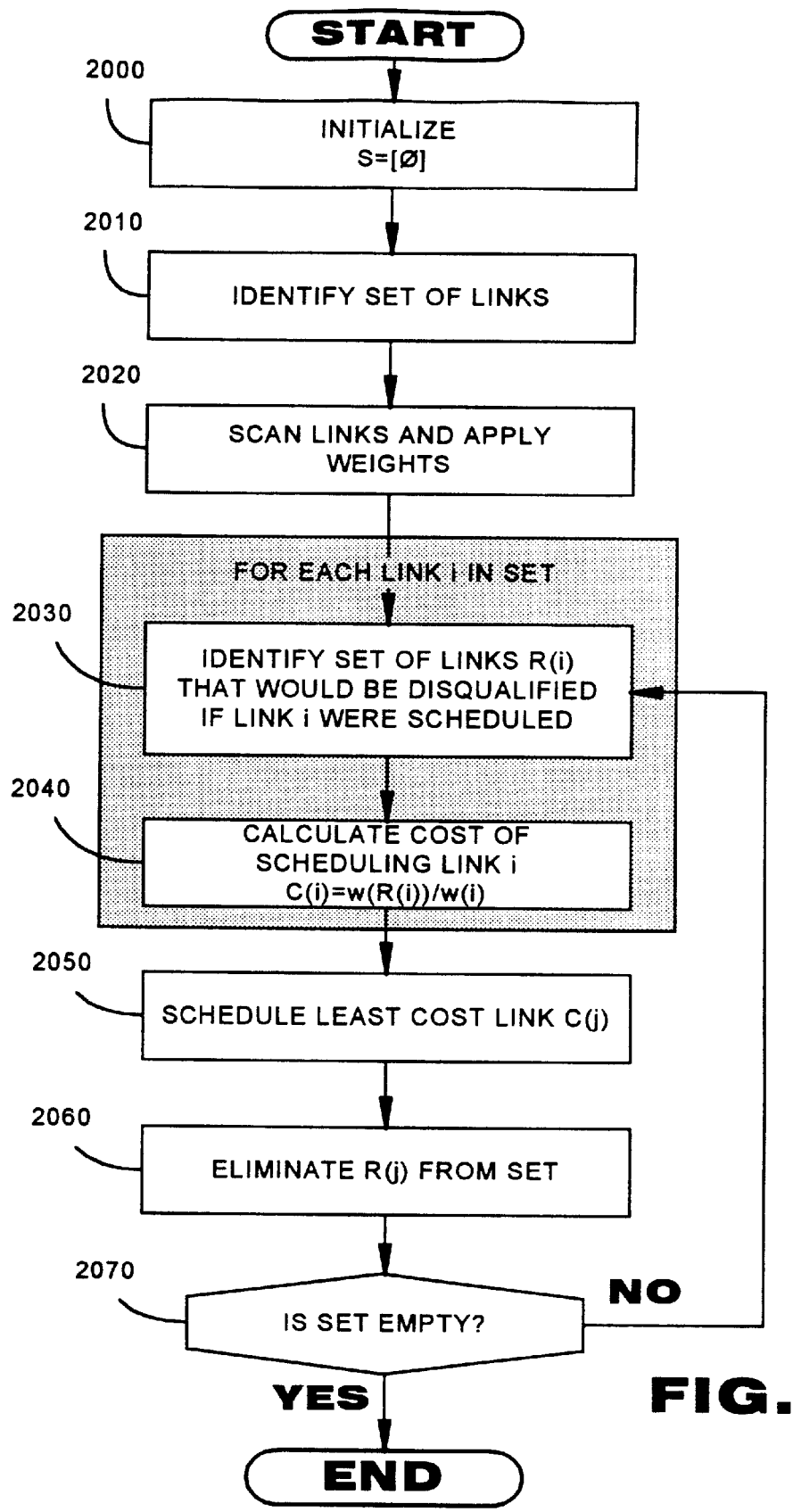
FIG. 3 is a flow chart describing the operation of a processor operating in accordance with a second embodiment of the present invention.

The second scheduling algorithm is shown in FIG. 3. As with the first scheduling algorithm, the system initializes the set of scheduled links S to be the empty set (S=[Ø]) (Step 2000). It identifies a set of links for consideration (Step 2010) and assigns a weight to each based on a predetermined attribute (Step 2020). Each link i is assigned a weight w(i).

The system scans the set of links for consideration in order of their weights. For each link i in the set, the system identifies a set of "disqualified links," R(i), other links that could not be added to S if link i were added to S (Step 2030). The system may scan the links sequentially or may poll them in a random order. The system identifies a cost of transmitting link i, C(i), by comparing the weight of link i to the weights of the disqualified links, w(R(i)), if link i were scheduled (c(i)=w(R(i))/w(i)) (Step 2040). As an alternative, the scheduling costs may be determined as the difference of R(i) and w(i) or as an exponential of such differences.

Once the cost of transmitting each link is determined, the system schedules the link having the lowest cost (Step 2050). The system then eliminates from the set for consideration the disqualified links associated with the scheduled link (Step 2060). Thus, if link j were scheduled, the disqualified links R(j) are removed from the set of links for consideration. Steps 2030–2060 repeat until the set of links for consideration is empty (Step 2070).

The second algorithm contains an advantage in that it prefers the links having the greatest weight but only if scheduling the preferred link will not have undue consequences in the scheduling of other links having comparable weights. As an example, the system may encounter an event where scheduling a link having the highest weight will preclude the system from scheduling links having the second and third highest weight due to interference. However, if the second and third links may be transmitted simultaneously, they may have a combined weight that exceeds the weight assigned to the first link. Using this second scheduling algorithm, the system schedules the second and third links for transmission over the first link. The first link would be deferred until a later time-step.

The present invention has been described in the context of a simplified TDM wireless transmission system. However, the principles of the present invention are not so limited. The stability determinations and scheduling scheme of the present invention find application in almost any communication system where pairs of transmitters and receivers vie for use of the same resource and may cause interference to each others' transmissions. Applications include cellular and non-cellular RF systems (including FDMA, TDMA and CDMA systems), optical systems and wired transport systems.

We claim:

1. A method of maintaining stability in a transmission system wherein a plurality of links are transmitting over a resource, comprising the steps of:

modeling characteristics of a transmission medium in which the transmission system operates;

determining from the characteristics an arrival rate at which the system may maintain stability; wherein the determining step is achieved by an approximation of the following expression:

$$\lambda_0 = \left(R - \frac{1}{\lambda_{n-1}(R^{-1}B)}B\right) \leq 1, \text{ where:}$$

R represents an arrival rate to each link in the system,

B represents the characteristics of the transmission medium, and $\lambda_0$ and $\lambda_{n-1}$ each represent eigenvalues obtained from their respective matrices; and limiting the arrival rate of new transmission to the system in accordance with the determined arrival rate.

2. The method of claim 1, wherein the modeling step includes a step of estimating an attenuation that a signal transmitted from a transmitter will endure when received by a receiver.

3. The method of claim 1, wherein the modeling step includes a step of estimating multi-path effects that a signal transmitted from a transmitter will endure when received by a receiver.

4. The method of claim 1, wherein the modeling step includes a step of estimating interference caused by other links using the same resource.

5. A method of maintaining stability in a transmission system wherein a plurality of links are transmitting over a resource, comprising the steps of:

modeling characteristics of a transmission medium in which the transmission system operates, determining from the characteristics an arrival rate at which the system may maintain stability, wherein the arrival rate is computed from:

$$r \leq \frac{\lambda_{n-1}(B)}{\lambda_{n-1}(B) - \lambda_0(B)}, \text{ where:}$$

r represents the arrival rate to each link in the system,
B represents the characteristics of the transmission medium, and
$\lambda_0$ and $\lambda_{n-1}$ each represent eigenvalues obtained from their respective matrices; and limiting the arrival rate of new transmission to the system in accordance with the determined arrival rate.

6. The method of claim 5, wherein B is a matrix formed from the following expression:

$$0 \leq (B+\Gamma^{-1})_{ij} \leq \min(G'_{ij}, G'_{ji})$$

where i and j reference transmitters and receivers in the system.

7. The method of claim 1, wherein the modeling further comprises determining a transmission gain and a power level for each of a set of links.

8. The method of claim 7, wherein the modeling further comprises determining a threshold parameter for each of the set of links.

* * * * *